US012601827B2

(12) United States Patent
Shahid et al.

(10) Patent No.: US 12,601,827 B2
(45) Date of Patent: Apr. 14, 2026

(54) OCCUPANCY DETECTION AND RANGE ESTIMATION USING WI-FI RADAR

(71) Applicant: QUALCOMM Incorporated, San Diego, CA (US)

(72) Inventors: Muhammad Osama Shahid, Mountain View, CA (US); Peyman Siyari, San Jose, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/491,698

(22) Filed: Oct. 20, 2023

(65) Prior Publication Data

US 2025/0130326 A1      Apr. 24, 2025

(51) Int. Cl.
*G01S 13/56* (2006.01)
*G01S 7/00* (2006.01)
*G01S 7/03* (2006.01)
*G01S 13/08* (2006.01)

(52) U.S. Cl.
CPC .............. *G01S 13/56* (2013.01); *G01S 7/006* (2013.01); *G01S 7/038* (2013.01); *G01S 13/08* (2013.01)

(58) Field of Classification Search
CPC .......... G01S 13/56; G01S 7/006; G01S 7/038; G01S 13/08; H04B 7/0452
See application file for complete search history.

(56) References Cited

U.S. PATENT DOCUMENTS

| | | | |
|---|---|---|---|
| 2020/0271753 A1 | 8/2020 | Va et al. | |
| 2021/0190702 A1* | 6/2021 | Wu | G01S 7/411 |
| 2022/0413088 A1 | 12/2022 | Va et al. | |
| 2023/0039849 A1* | 2/2023 | Rao | G06F 3/017 |

FOREIGN PATENT DOCUMENTS

| | | | | |
|---|---|---|---|---|
| CN | 113691470 A | * 11/2021 | ......... | H04L 25/0242 |
| EP | 3869223 A1 | 8/2021 | | |

OTHER PUBLICATIONS

18491698_2025-09-19_CN_113691470_A_M.pdf, machine translation of CN-113691470-A (Year: 2021).*
International Search Report and Written Opinion—PCT/US2024/045424—ISA/EPO—Nov. 26, 2024.

* cited by examiner

*Primary Examiner* — William Kelleher
*Assistant Examiner* — Kenneth W Good
(74) *Attorney, Agent, or Firm* — Thien T. Nguyen

(57) ABSTRACT

Aspects presented herein may improve the accuracy and reliability of radio frequency (RF) sensing performed by wireless devices, which may include detection of living objects with minimal movements (e.g., breathing). In one aspect, a UE receives a set of signals over a time period, where each signal in the set of signals includes a superposition of multipath signals traversed by the signal and a leakage signal. The UE filters out the leakage signal from each signal in the set of signals to obtain the superposition of the multipath signals for each signal. The UE detects whether there is a variance across the filtered set of signals over the time period. The UE identifies a presence of at least one moving object in response to the detection of the variance.

28 Claims, 14 Drawing Sheets

1200

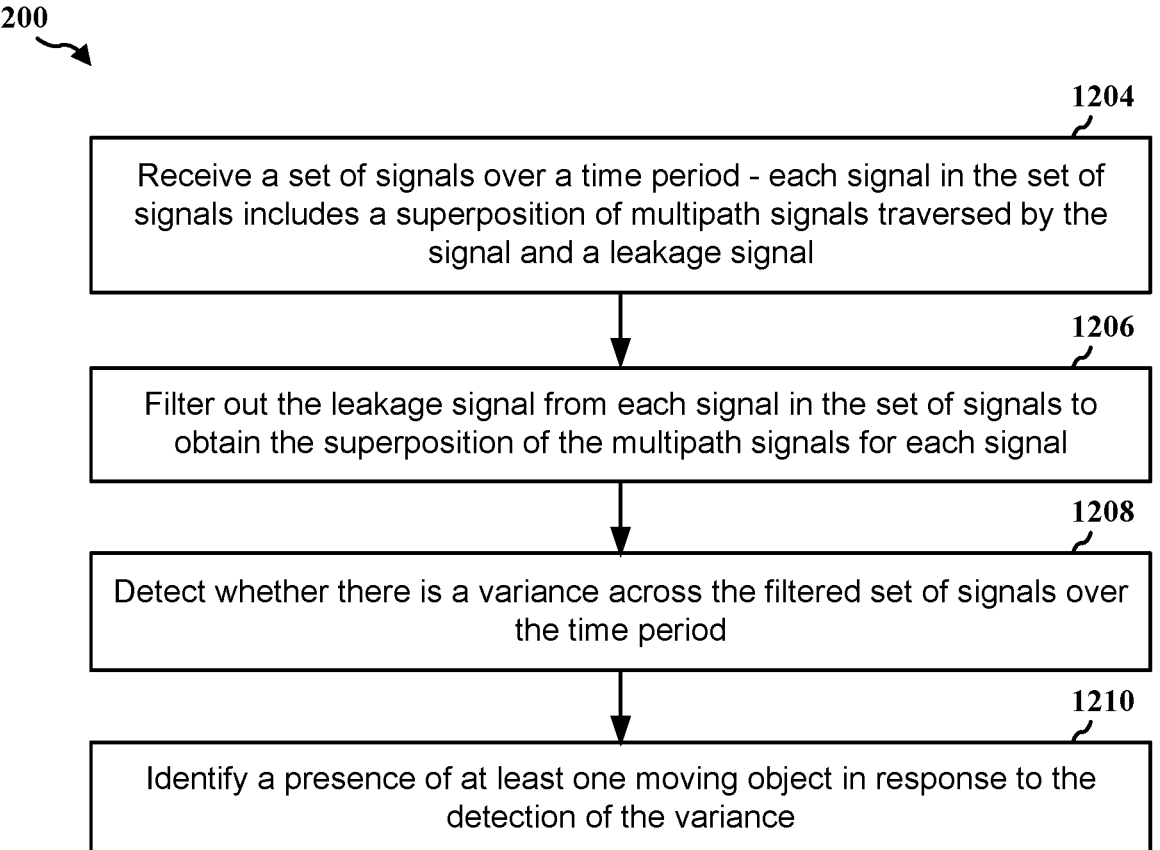

1204

Receive a set of signals over a time period - each signal in the set of signals includes a superposition of multipath signals traversed by the signal and a leakage signal

1206

Filter out the leakage signal from each signal in the set of signals to obtain the superposition of the multipath signals for each signal

1208

Detect whether there is a variance across the filtered set of signals over the time period

1210

Identify a presence of at least one moving object in response to the detection of the variance

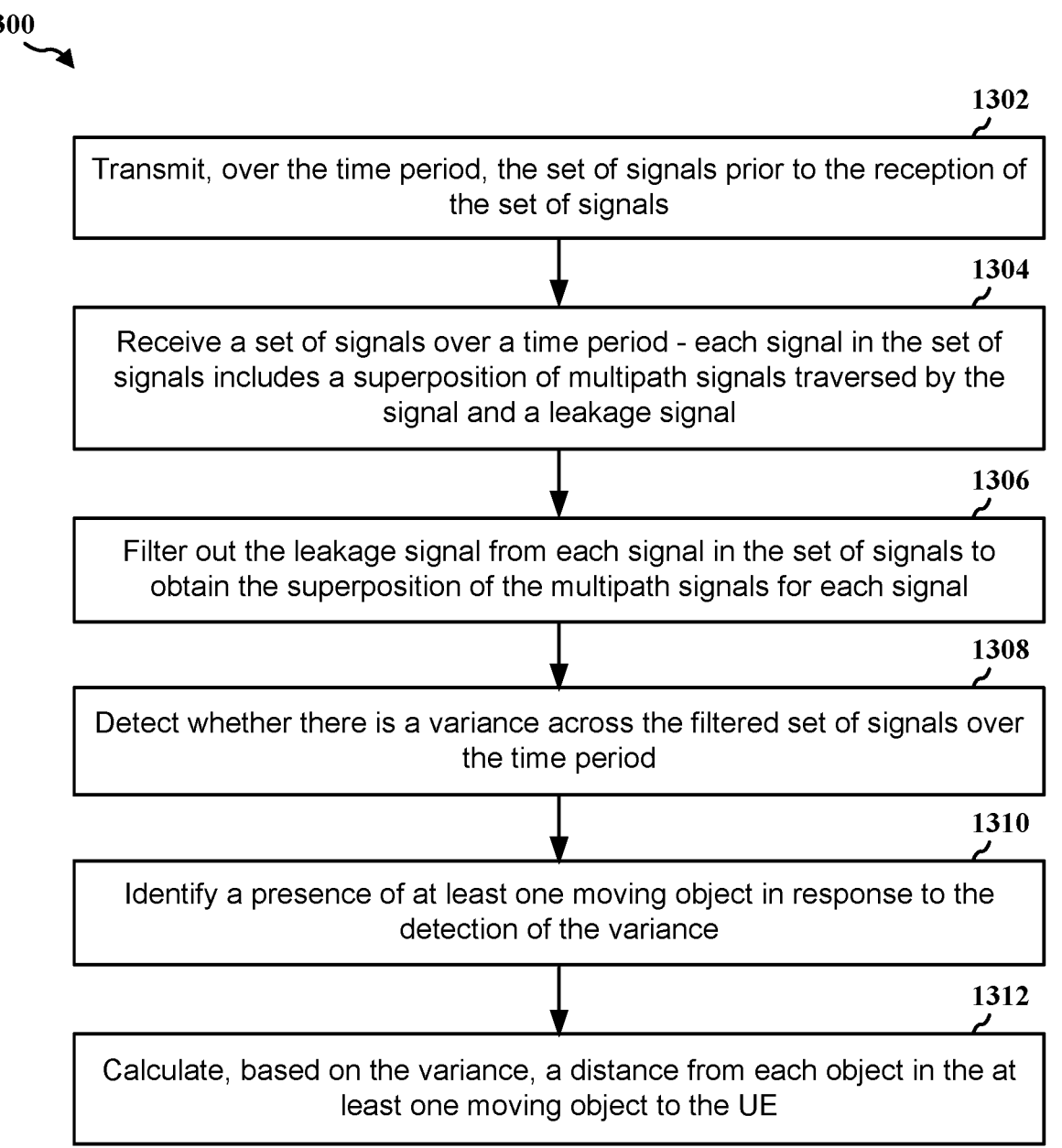

1302

Transmit, over the time period, the set of signals prior to the reception of the set of signals

1304

Receive a set of signals over a time period - each signal in the set of signals includes a superposition of multipath signals traversed by the signal and a leakage signal

1306

Filter out the leakage signal from each signal in the set of signals to obtain the superposition of the multipath signals for each signal

1308

Detect whether there is a variance across the filtered set of signals over the time period

1310

Identify a presence of at least one moving object in response to the detection of the variance

1312

Calculate, based on the variance, a distance from each object in the at least one moving object to the UE

FIG. 13

OCCUPANCY DETECTION AND RANGE ESTIMATION USING WI-FI RADAR

TECHNICAL FIELD

The present disclosure relates generally to communication systems, and more particularly, to wireless communication involving object detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a set of signals over a time period, where each signal in the set of signals includes a superposition of multipath signals traversed by the signal and a leakage signal. The apparatus filters out the leakage signal from each signal in the set of signals to obtain the superposition of the multipath signals for each signal. The apparatus detects whether there is a variance across the filtered set of signals over the time period. The apparatus identifies a presence of at least one moving object in response to the detection of the variance.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 12 is a flowchart of a method of wireless communication.

FIG. 13 is a flowchart of a method of wireless communication.

DETAILED DESCRIPTION

Figure 1:
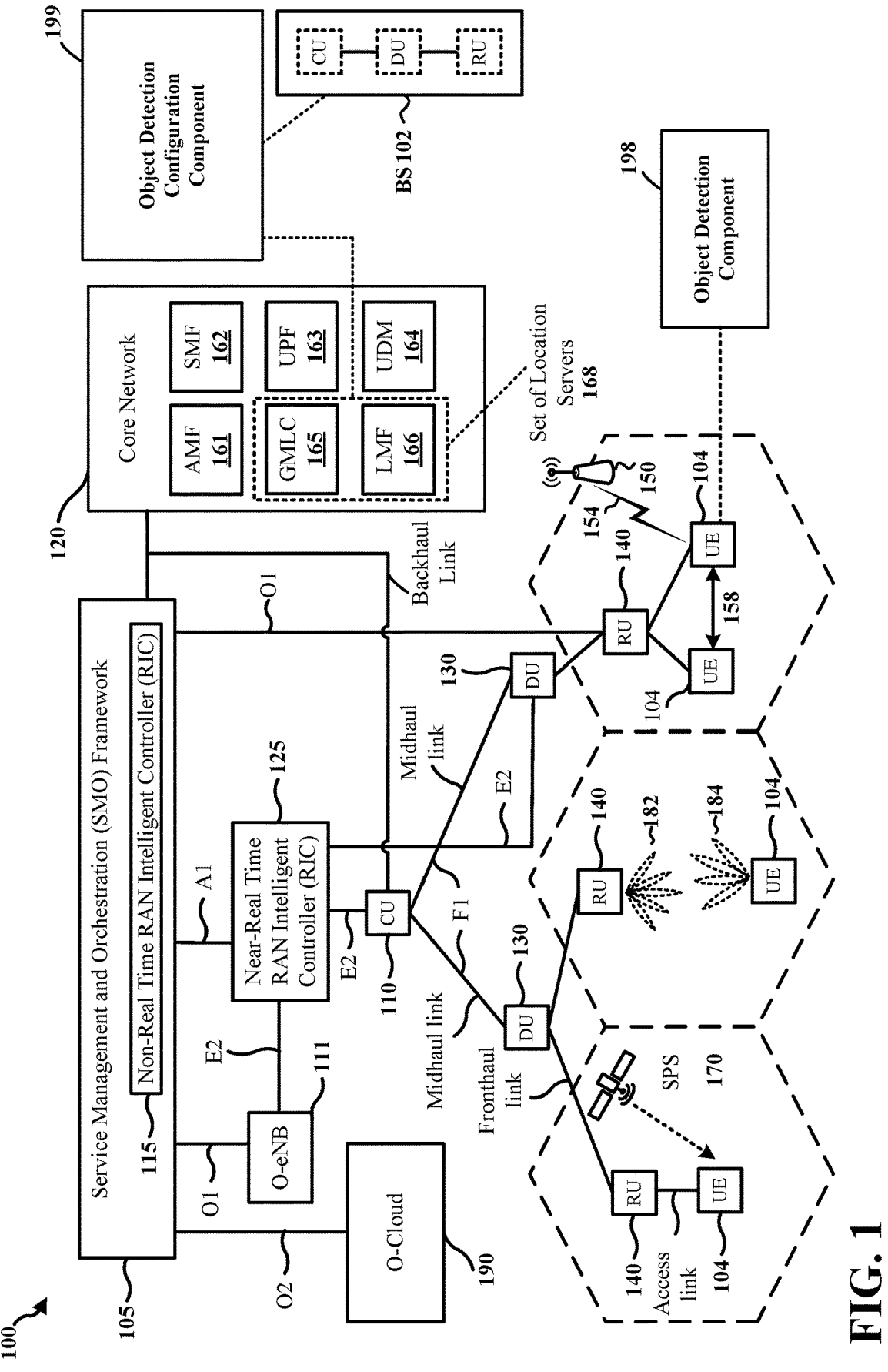
FIG. 1 is a diagram illustrating an example of a wireless communications system and an access network.

Aspects presented herein may improve the accuracy and reliability of radio frequency (RF) sensing performed by wireless devices, such as sensing performed by Wi-Fi® devices. Aspects presented herein may enable wireless devices to distinguish living being(s) from non-living thing(s) presented in the background during sensing, thereby enabling the wireless device to detect occupancy/presence of living being(s) and estimate distance of the detected living being(s) from the wireless device. For example, in one aspect of the present disclosure, a Wi-Fi® radar may be configured to perform sensing based on using a single radio, such that just a single device (e.g., the Wi-Fi® radar) is specified for the sensing, as for most applications (e.g., mobile phones, tablet computers, etc.) users may have just a single device at hand. Also, Wi-Fi® radar(s) may not have interoperability issues, as in some scenarios, sensing through multiple sensing devices may degrade sensing capabilities as one of the devices may be obstructed by obstacles such as wall(s). Aspects presented herein may provide an accurate or improved room occupancy detection, such as detection of living objects that are moving and/or sitting/standing still with minimal body movements (e.g., breathing) in an environment. In some implementations, aspects presented herein may also be used to count the number of objects (e.g., living beings) in an environment (e.g., if they are spatially separated and have varying distances from an RF/Wi-Fi® radar (e.g., an access point (AP)).

Aspects presented herein is directed to techniques for using leakage cancellation to improve object detection and ranging based on Wi-Fi® signals. Aspects presented herein provide leakage cancellation to improve the detection and extraction of signals variations, which may include: initialize a signal, residual signal to be equal to the captured signal (e.g., a known sequence of signal that is transmitted by a transmitter so that a receiver may use the known sequence of the signal to perform channel estimation and obtain channel impulse response (CIR), an example signal with a known sequence is the Long Training Field (LTF)); compute CIR using the residual signal through a number of iterations to extract the peaks of signals due to multipath.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 inter-face). For virtualized network elements, the SMO Frame-work 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Addi-tionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and opti-mization of RAN elements and resources, artificial intelli-gence (AI)/machine learning (ML) (AI/ML) workflows including model training and updates, or policy-based guid-ance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Frame-work 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN manage-ment policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The commu-nication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (is a trademark of the Wi-Fi Alliance) based on the Institute of Electrical and Electronics Engineers (IEEE) 802.11 stan-dard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spec-trum, the UEs 104/AP 150 may perform a clear channel assessment (CCA) prior to communicating in order to deter-mine whether the channel is available.

The electromagnetic spectrum is often subdivided, based on frequency/wavelength, into various classes, bands, chan-nels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue some-times occurs with regard to FR2, which is often referred to (interchangeably) as a "millimeter wave" band in documents and articles, despite being different from the extremely high frequency (EHF) band (30 GHz-300 GHz) which is identi-fied by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an object detection component 198 that may be configured to receive a set of signals over a time period, where each signal in the set of signals includes a superposition of multipath signals traversed by the signal and a leakage signal; filter out the leakage signal from each signal in the set of signals to obtain the superposition of the multipath signals for each signal; detect whether there is a variance across the filtered set of signals over the time period; and identify a presence of at least one moving object in response to the detection of the variance. In certain aspects, the base station 102 or the one or more location servers 168 may have an object detection configuration component 199 that may be configured to provide configurations and/or parameters related to object detection for the UE 104.

Figures 2A, 2B, 2C, 2D:
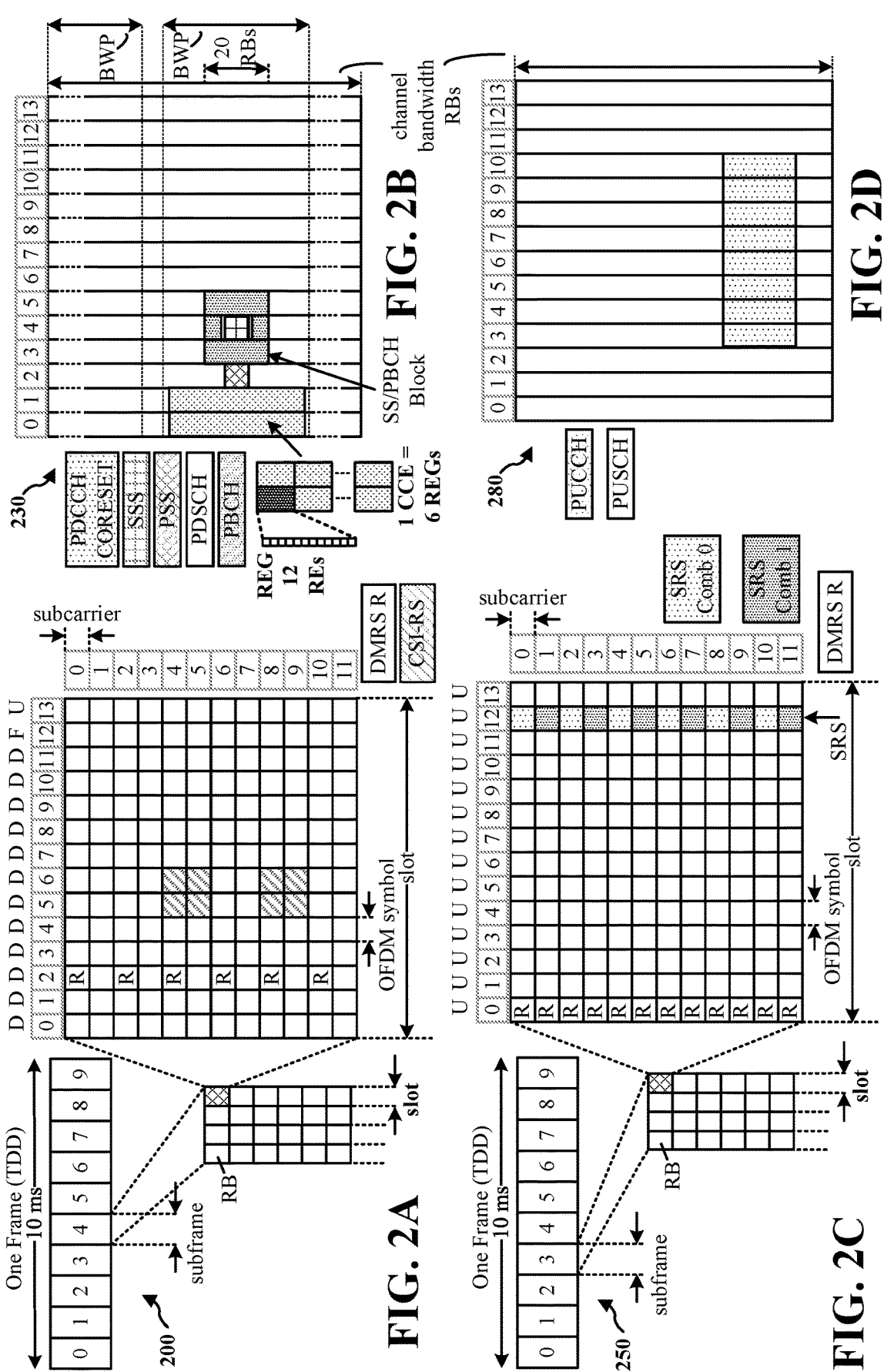
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
|---|---|---|
| $\mu$ | SCS $\Delta f = 2^\mu \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |

TABLE 1-continued

| | Numerology, SCS, and CP | |
|---|---|---|
| $\mu$ | SCS $\Delta f = 2^\mu \cdot 15[kHz]$ | Cyclic prefix |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
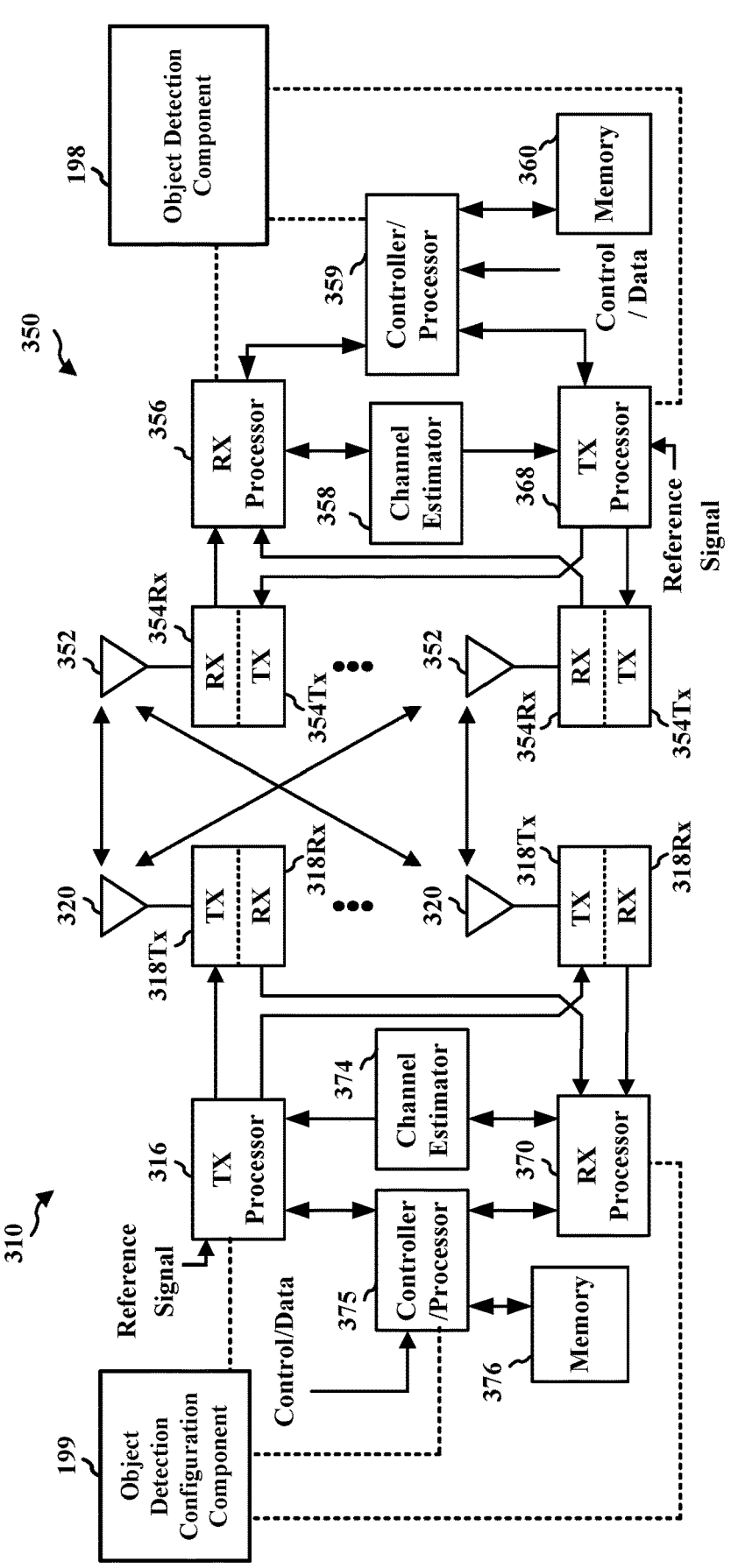
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the object detection component 198 of FIG. 1.

At least one of the TX processor 316, the RX processor 370, and the controller/processor 375 may be configured to perform aspects in connection with the object detection configuration component 199 of FIG. 1.

Figure 4:
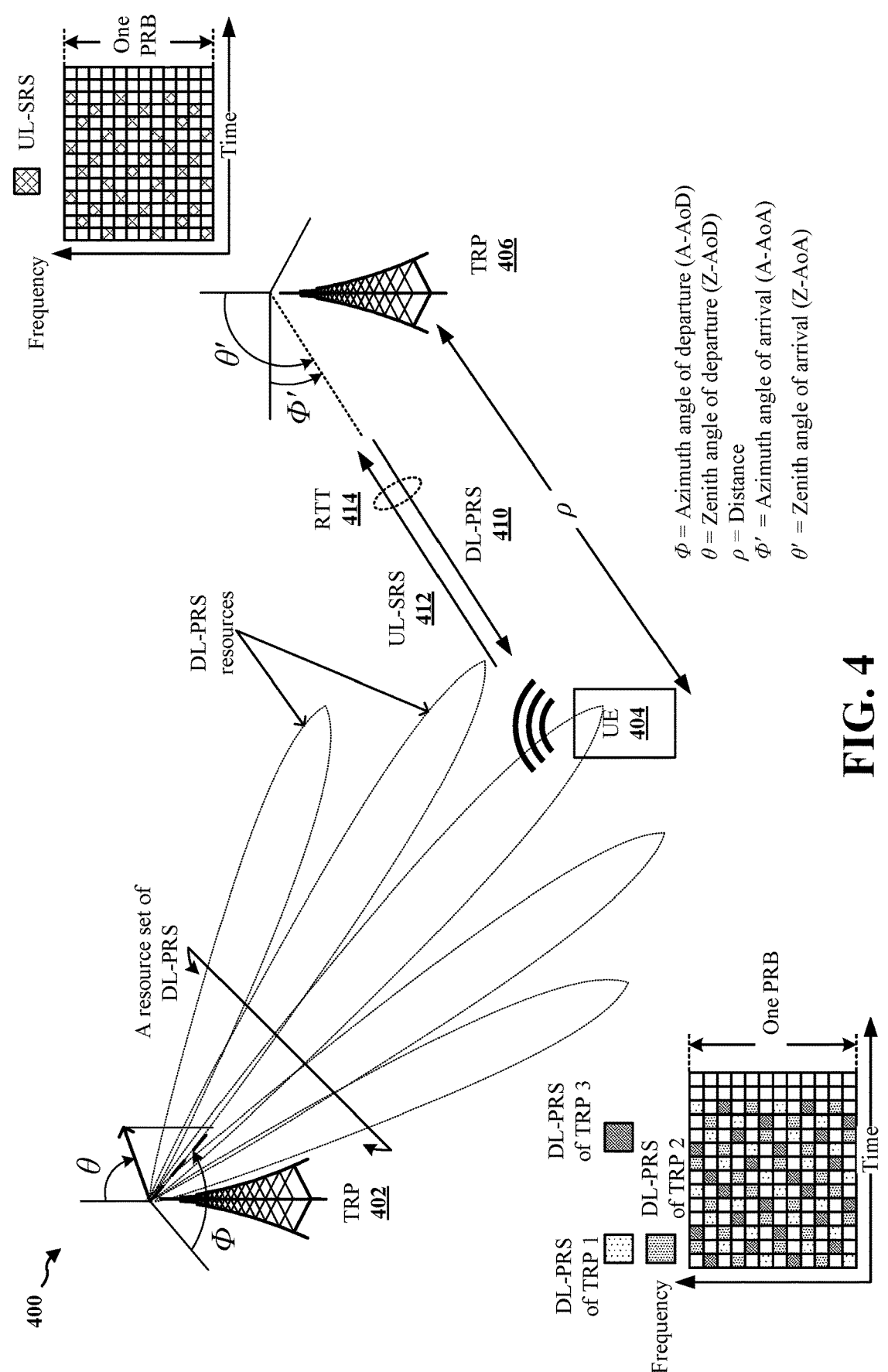
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE RX-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP RX-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE RX-Tx time difference measurements (and/or DL PRS-RSRP of the received signals) using assistance data received from the positioning server, and the TRPs 402, 406 measure the gNB RX-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

Various network-based positioning methods may be suitable for indoor positioning as they do not rely on the reception of satellite signals (e.g., GNSS signals for GNSS-based positioning), where satellite signals may generally degrade or become unavailable in an indoor environment. For example, indoor localization systems (e.g., systems for determining the position of one or more objects in an indoor environment) may use various techniques for positioning, such as based on measurements of time of flight (TOF), time of arrival (TOA), time difference of arrival (TDOA), angle of arrival (AOA), and/or received signal strength indicator (RSSI) of reference signals, or based on neural implicit representation, etc.

In some examples, positioning methods/mechanisms may be classified into active positioning (which may also be referred to and used interchangeably with "active localization") and passive positioning (which may also be referred to and used interchangeably with "passive localization"). The class of active localization systems may specify that an object that is to be detected and tracked to carry a tag (e.g., a radio frequency (RF) tag) or a positioning device (e.g., which may be a UE or a device capable of transmitting/receiving positioning reference signals). On the other hand, for the class of passive location system, an object may be located and tracked without attaching a tag or a positioning device to the object. For example, in a passive localization system, such as a radar system, the reflection of electromagnetic wave from the surface of an object body may cause a distortion to the measured signal. Such distortions in communication channel may be the source of information for the sensing/perception task, like object/person localization.

Figure 5:
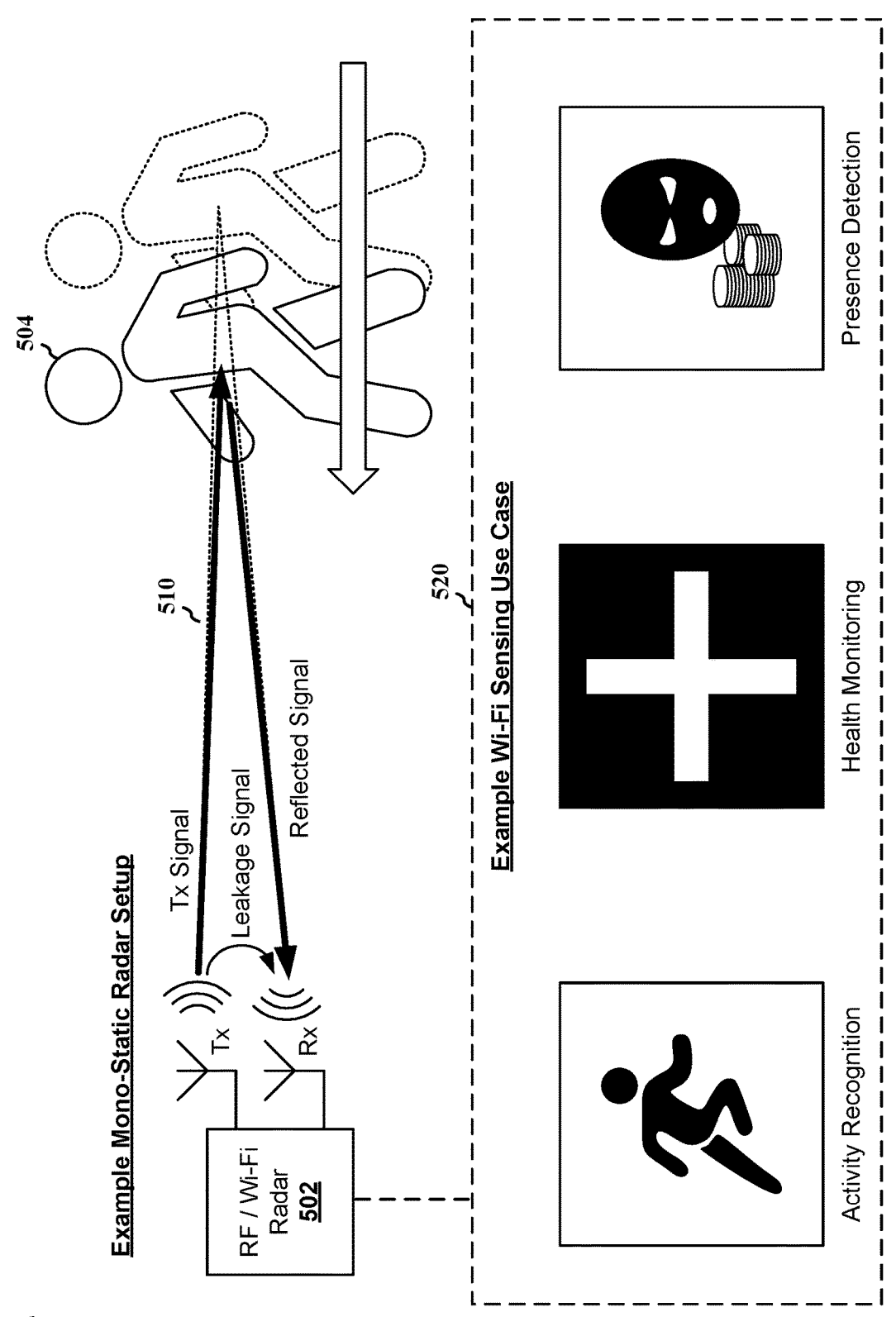
FIG. 5 is a diagram illustrating an example of passive positioning based on radio frequency (RF) sensing in accordance with various aspects of the present disclosure.

FIG. 5 is a diagram 500 illustrating an example of passive positioning based on radio frequency (RF) sensing (e.g., based on a Wi-Fi® device/radar) in accordance with various aspects of the present disclosure. For purposes of the present disclosure, a wireless device (e.g., an access point (AP), a transmission reception point (TRP), a UE, a Wi-Fi® device, a base station, a component of the base station, a UE, etc.) may be configured to include radar capabilities, which may be referred to as "sensing," "radio frequency (RF) sensing," and/or "cellular-based RF sensing," etc. For example, as shown at 510, a wireless device 502 (e.g., an RF/Wi-Fi® radar) may transmit reference signals (e.g., radar reference signals (RRSs), Wi-Fi® packets, etc.) and measure the reference signals reflected from one or more objects 504 (which may be referred to as "reflected reference signal(s)" or "reflected signal(s)" hereafter). Based at least in part on the measurement of the reflected reference signals, the wireless device 502 may determine or estimate a distance between the wireless device 502 and the one or more objects 504 (e.g., which may be proportional to the time of flight of the reference signal). For purposes of the present disclosure, a device that is capable of performing RF sensing (e.g., transmitting and/or receiving reference signals for detecting an object or for estimating the distance between the device and the object) may be referred to as an "RF sensing node." For example, an RF sensing node may be a UE, a TRP, a Wi-Fi® device, a base station, a component of the base station, a TRP, a device capable of transmitting RRS, and/or a device configured to perform radar functions, etc. In addition, Wi-Fi® or Wi-Fi® technology may refer to a wireless networking technology that uses radio waves for communication, such as to provide wireless Internet access. A Wi-Fi® device may refer to an electronic device that utilizes Wi-Fi® technology to connect to wireless networks, enabling internet access and communication with other devices and services without the specification for physical connections. A Wi-Fi® radar may refer to a Wi-Fi® device with the radar/sensing capability. Also, a mono-static radar may refer to a type of radar system or RF sensing node where the transmitter (e.g., transmission (Tx) antenna(s)) and the receiver (e.g., reception (RX) antenna(s)) are located at the same physical location. In other words, both the radar's antenna(s) for transmitting radio waves and the antenna(s) for receiving the reflection (e.g., echoes) of those radio waves are co-located.

Over the last few decades, Wi-Fi® technology has evolved from merely a communication module to a wireless sensor that is capable of sensing an environment (which may also be referred to as "environment sensing"). As Wi-Fi® has become ubiquitous where virtually every other device in residential homes and/or commercial offices are connected to the world, extending functions of Wi-Fi® capable devices have been a goal for many manufacturers, such as using Wi-Fi® to perform environment sensing (e.g., detection of object(s) in an environment). For example, as shown at 520, example of Wi-Fi® sensing use cases may include activity recognition (e.g., recognizing an activity performed by a user), heal monitoring (e.g., monitoring some of a user's health vitals), and/or presence detections (e.g., detection of moving objects in a space such as an intruder in a house or a baby/pet left unattended in a vehicle, etc.).

Figures 6A, 6B:
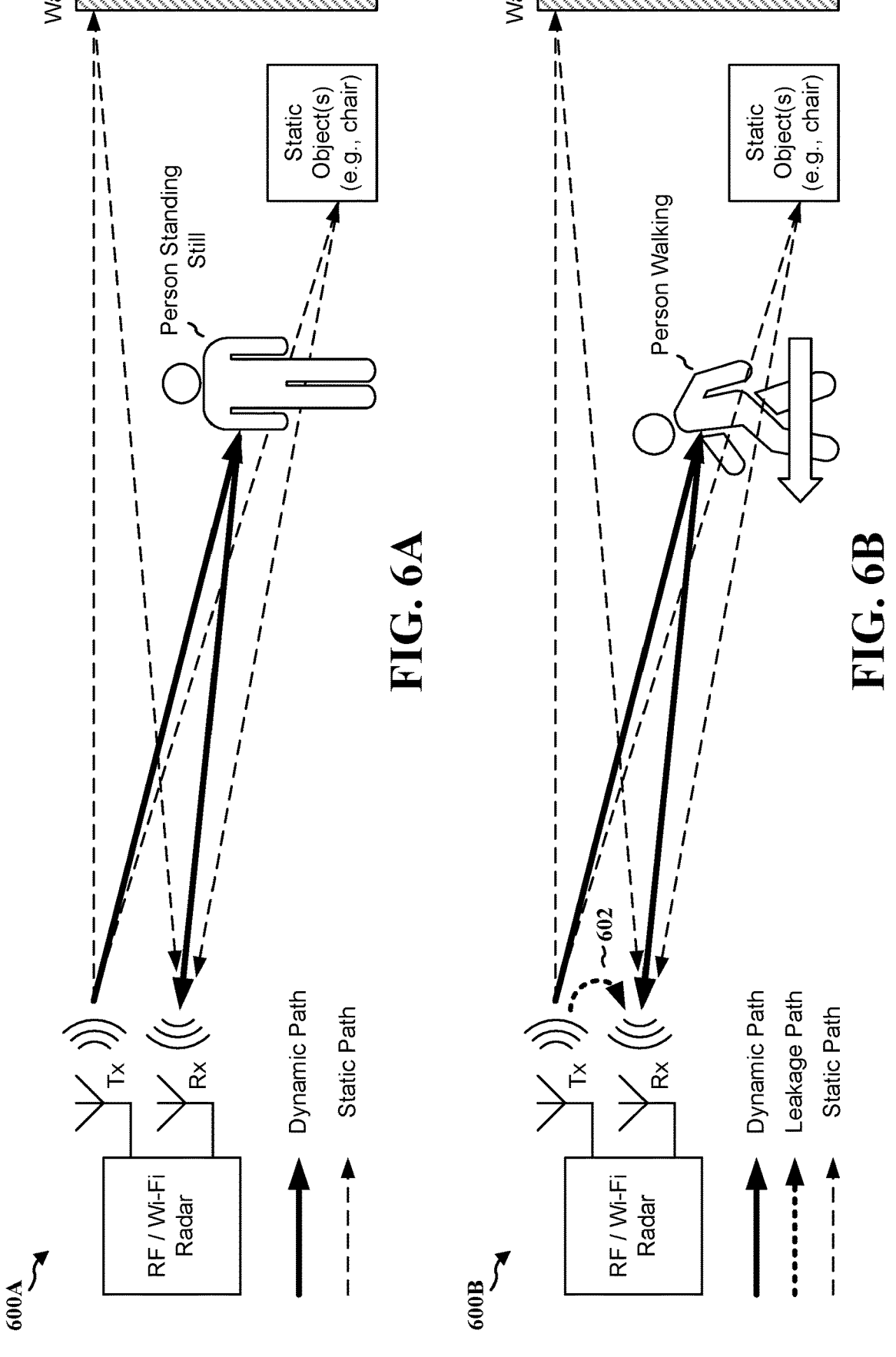
FIG. 6A is a diagram illustrating an example of passive positioning involving a person standing still in accordance with various aspects of the present disclosure.
FIG. 6B is a diagram illustrating an example of passive positioning involving a person moving in accordance with various aspects of the present disclosure.

In most existing environment sensing algorithms involving Wi-Fi® radars, presence/occupancy detection (e.g., detection of whether an environment is occupied by one or more objects) may rely on detection of any motion(s) in the environment (e.g., motions performed by the one or more objects). However, in scenarios where the one or more objects (e.g., which may be referred to as "target object(s)") might be stationary (e.g., not moving) in an environment, existing environment sensing algorithms may not be able to predict their occupancy/presence accurately. For example, as shown by a diagram 600A of FIG. 6A, when a person is standing still, an RF/Wi-Fi® radar may not be able to detect the presence of the person when the detection is based on a current environment sensing algorithm.

In other scenarios, while a wireless device (e.g., a Wi-Fi® radar) may be configured to perform sensing functions, such as transmitting reference signals and receiving reflected signals as described in connection with FIG. 5, strong leakage signals (e.g., signal(s) or portion(s) of the signal(s) transmitted from a wireless device may be immediately received by the wireless device before the signals are reflected) may interfere and overwhelm the reflected signals. As such, the wireless device may not be able to perform the sensing accurately (or at all). For example, as shown by a diagram 600B of FIG. 6B, even when a person to be detected is walking, leakage signals from an RF/Wi-Fi® radar (e.g., denoted by "leakage path") may overwhelm the signals reflected from the person (e.g., denoted by the "dynamic path") as shown at 602, meaning that the strength of the leakage signals may be much higher than the reflected signals. This may cause the RF/Wi-Fi® radar unable to detect/differentiate the reflected signals, thereby unable to detect the occupancy/presence of one or more objects in an environment.

Aspects presented herein may improve the accuracy and reliability of RF sensing performed by wireless devices, such as sensing performed by Wi-Fi® devices. Aspects presented herein may enable wireless devices to distinguish living beings from non-living things presented in the background during sensing, thereby enabling the wireless device to detect occupancy/presence of living being(s) and estimate distance of the detected living being(s) from the wireless device. For example, in one aspect of the present disclosure, a Wi-Fi® radar may be configured to perform sensing based on using a single radio, such that just a single device is specified for the sensing, as for most applications (e.g., mobile phones, tablet computers, etc.) users may have just a single device at hand. Also, Wi-Fi® radar(s) may not have interoperability issues, as in some scenarios, sensing through multiple sensing devices may degrade sensing capabilities as one of the devices may be obstructed by obstacles such as wall(s). Aspects presented herein may provide an accurate or improved room occupancy detection, such as detection of living objects that are moving and/or sitting/standing still with minimal body movements (e.g., breathing) in an environment. In some implementations, aspects presented herein may also be used to count the number of objects (e.g., living beings) in an environment (e.g., if they are spatially separated and have varying distances from an RF/Wi-Fi® radar (e.g., an access point (AP)).

Figure 7:
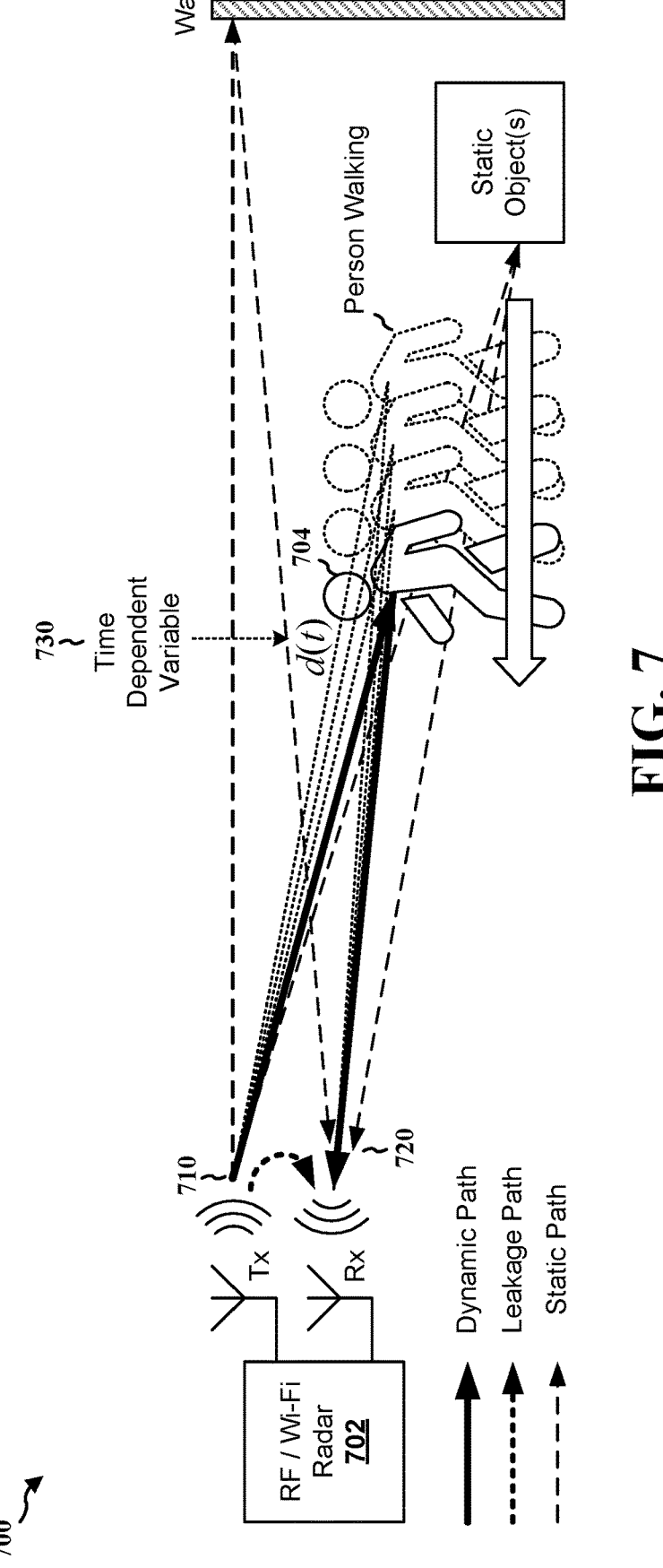
FIG. 7 is a diagram illustrating an example signal propagation of a moving object in accordance with various aspects of the present disclosure.

FIG. 7 is a diagram 700 illustrating an example signal propagation of a moving object in accordance with various aspects of the present disclosure. As shown at 710, when a wireless device 702 (e.g., an RF/Wi-Fi® radar) transmits wireless signals (e.g., Wi-Fi® packets), the wireless signals may propagate and reflect off from different surfaces, such as from the surface of a moving person 704, a wall, and/or a static object, etc. Then, as shown at 720, the wireless device 702 may receive a superposition of multiple paths (multipath) traversed by the signal, which may include a set of dynamic paths and a set of static paths. For purposes of the present disclosure, a dynamic path may refer to a path (e.g., a path travelled by a signal, which may also be referred to as a "signal path") that reflects off from a moving object (e.g., a living being) presented in an environment, and a static path may refer to a path that reflects off from a static (and non-living) object (e.g., a wall, a piece of furniture, a floor, a ceiling, etc.). In addition, a leakage path may refer to a path travelled by a leakage signal (e.g., directly from a Tx antenna to an RX antenna). Also, for purposes of the present disclosure, "multipath(s)" or "multipath signal(s)" may refer to signal(s) traversed via the dynamic path(s) and the static path(s) (which may also collectively be referred to as "reflected signal(s)"), and may exclude the leakage signal. Similarly, "superposition of multipath" or "superposition of multipath signals" may refer to the superposition (e.g., the combination, the addition, etc.) of signal(s) traversed via the dynamic path(s) and the static path(s), and may exclude the leakage signal.

As shown at 730, as an object (e.g., the moving person 704) moves, the length of its corresponding dynamic path may also change (e.g., becomes shorter if the object is moving toward the wireless device 702 or becomes longer if the object is moving away from the wireless device 702). As such, the phase of the object may also change. In one example, a reflected signal from a moving object (e.g., the moving person 704) may be represented by:

$$H(f, t) = A\, e^{-j 2\pi \frac{d(t)}{\lambda}}$$

where H(f,t) may represent the reflected signal from the moving object at certain frequency (f) and time (t), A is the magnitude of the reflected signal (e.g., the signal strength), and $$2\pi \frac{d(t)}{\lambda}$$

is the phase of the reflected signal as shown at 730. However, while the phase (e.g., the phase of channel state information (CSI)) of a dynamic path may be used for capturing the changes in the length of the dynamic path, the leakage signal (e.g., from the Tx antenna) may be strong and overwhelm all the multipaths (e.g., cover the reflected signals received from the dynamic path and the set of static paths). As such, in one aspect of the present disclosure, an algorithm that is capable of identifying and canceling leakage signal(s) is implemented at the wireless device 702, such that the wireless device 702 may be able to extract different signal variations (e.g., signals from different paths) from the received signals. In other words, the algorithm described herein may enable the wireless device 702 to differentiate signals in the dynamic path(s) and/or the static path(s) from signals in the leakage path(s) (which may be referred to as "leakage signal(s)" for purposes of the present disclosure).

Figure 8:
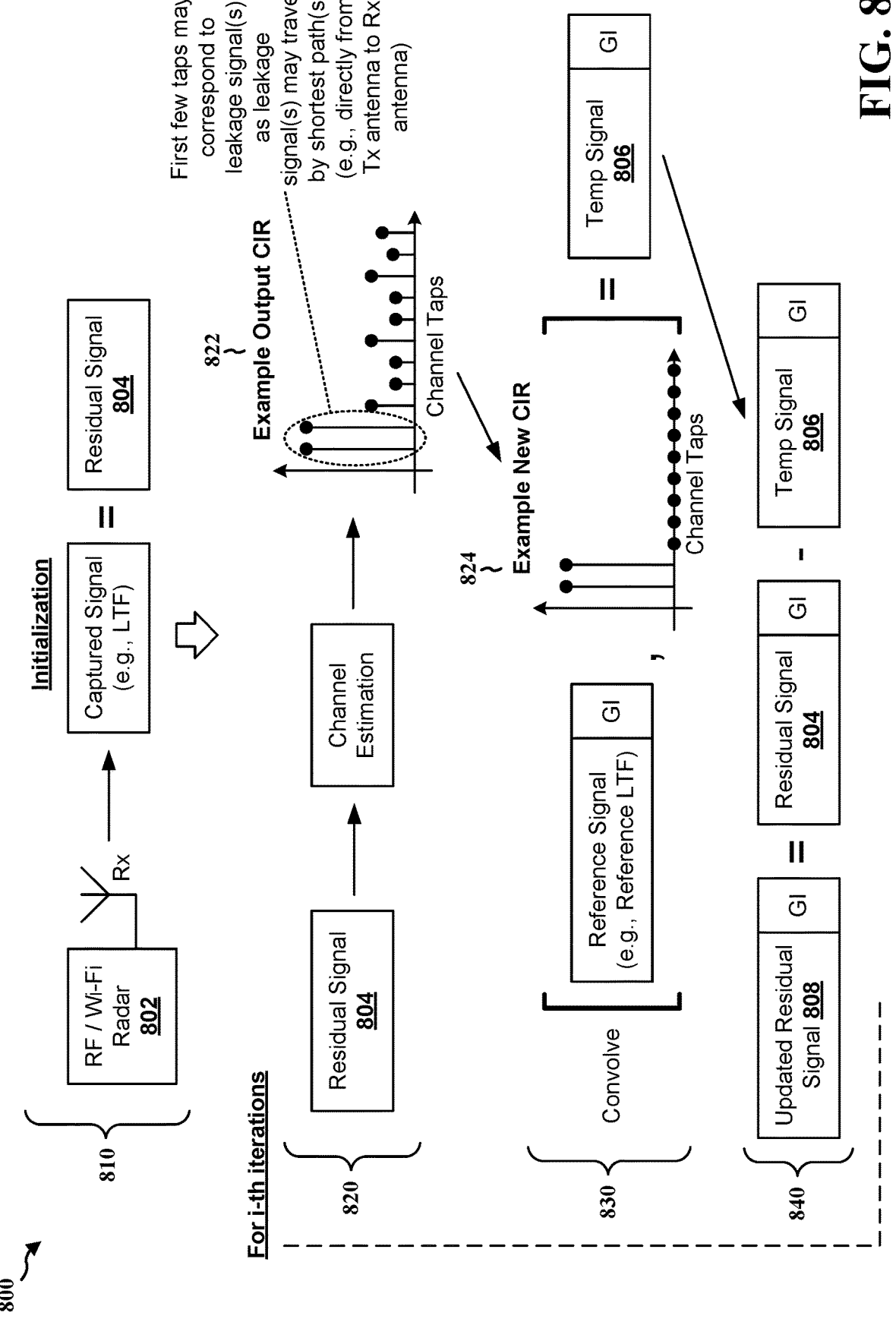
FIG. 8 is a diagram illustrating an example algorithm for leakage signal cancellation in accordance with various aspects of the present disclosure.

FIG. 8 is a diagram 800 illustrating an example algorithm for leakage signal cancellation (which may also be referred to as "leakage cancellation" or "cancellation of leakage signal") in accordance with various aspects of the present disclosure.

At 810, initially (e.g., at the beginning of a leakage cancellation process/session), a wireless device 802 (e.g., an RF/Wi-Fi® radar) may be configured to capture (e.g., receive) a signal (e.g., a packet) transmitted by the wireless device 802. For example, the wireless device 802 may be configured to transmit a signal via at least one of its Tx antennas, and capture the signal(s) reflected from multiple surfaces (i.e., the reflected signal(s)) and/or the signal(s) leaked from the Tx antenna(s) (i.e., the leakage signal(s)) via at least one of its RX antennas, such as described in connection with FIG. 7. During this initialization process, the wireless device 802 may set the captured signal (e.g., the captured LTF) to be equal to a residual signal 804 (e.g., captured signal=residual signal). Then, the wireless device 802 may continue to transmit signals and capture the reflected signals and the leakage signals.

At 820, the wireless device 802 may be configured to perform a channel estimation for the residual signal 804 (e.g., the first captured signal, which may be referred to as a first (1$^{st}$) iteration), such as computing the channel impulse response (CIR) for the residual signal 804. As shown at 822, as the residual signal 804 may include the leakage signal, the leakage signal may appear on the first few channel taps of the computed CIR. For purposes of the present disclosure, a channel tap may refer to a response of a communication channel at a specific discrete point in time or space. For example, as the path travelled by a leakage signal is likely to be much shorter (e.g., directly from a Tx antenna to an RX antenna as shown by FIG. 7) compared to a reflected signal, the leakage signal likely will appear on the first few channel taps (e.g., first few time instances) of the CIR.

Then, as shown at 824, the wireless device 802 may be configured to compute a new CIR based on a previous CIR (which may be referred to as an output CIR as shown at 822), where the new CIR may be configured to retain a specified range of channel taps (e.g., [0, X], [−X, . . . , 0, . . . , X], [X, Y], etc.) of output CIR and forces other channel taps to be equal to zeros). For example, the wireless device 802 may be configured to retain the first two channel taps of the CIR and set the rest of/subsequent channel taps to zeros as shown at 824. In other words, the wireless device 802 may be configured to assume that most of the leakage signal(s) may be captured by the first two channel taps.

At 830, the wireless device 802 may be configured to convolve the computed new CIR with a reference signal that has not been passed over the channel (e.g., the reference signal has not been transmitted by the wireless device 802). For purposes of the present disclosure, when one signal convolves with another signal, it may refer to two signals are combined to form a third signal. Then, the wireless device 802 may store the convolved signal (e.g., the combination of the reference signal and the new CIR) as a temporary signal 806 (temp_sig). This temporary signal 806 may capture most of the leakage energy of the original raw signal captured.

At 840, the wireless device 802 may subtract the temporary signal 806 from the residual signal 804 (e.g., computed at 820) to obtain an updated residual signal 808 which may include just the reflected signal(s), e.g., residual signal= leakage signal+reflected signal(s), temporary signal= leakage signal, therefore this subtraction may yield just the reflected signal(s).

To ensure the accuracy and reliability of the leakage signal cancellation (or the extraction of the reflected signal), the wireless device 802 may be configured to repeat the process described in connection with 820, 830, and 840 for a defined number of times (e.g., for i iterations). For example, the wireless device 802 may continue i iterations to suppress the leakage signals and extract the peaks from the reflected signals due to multipath.

Figures 9A, 9B, 9C:
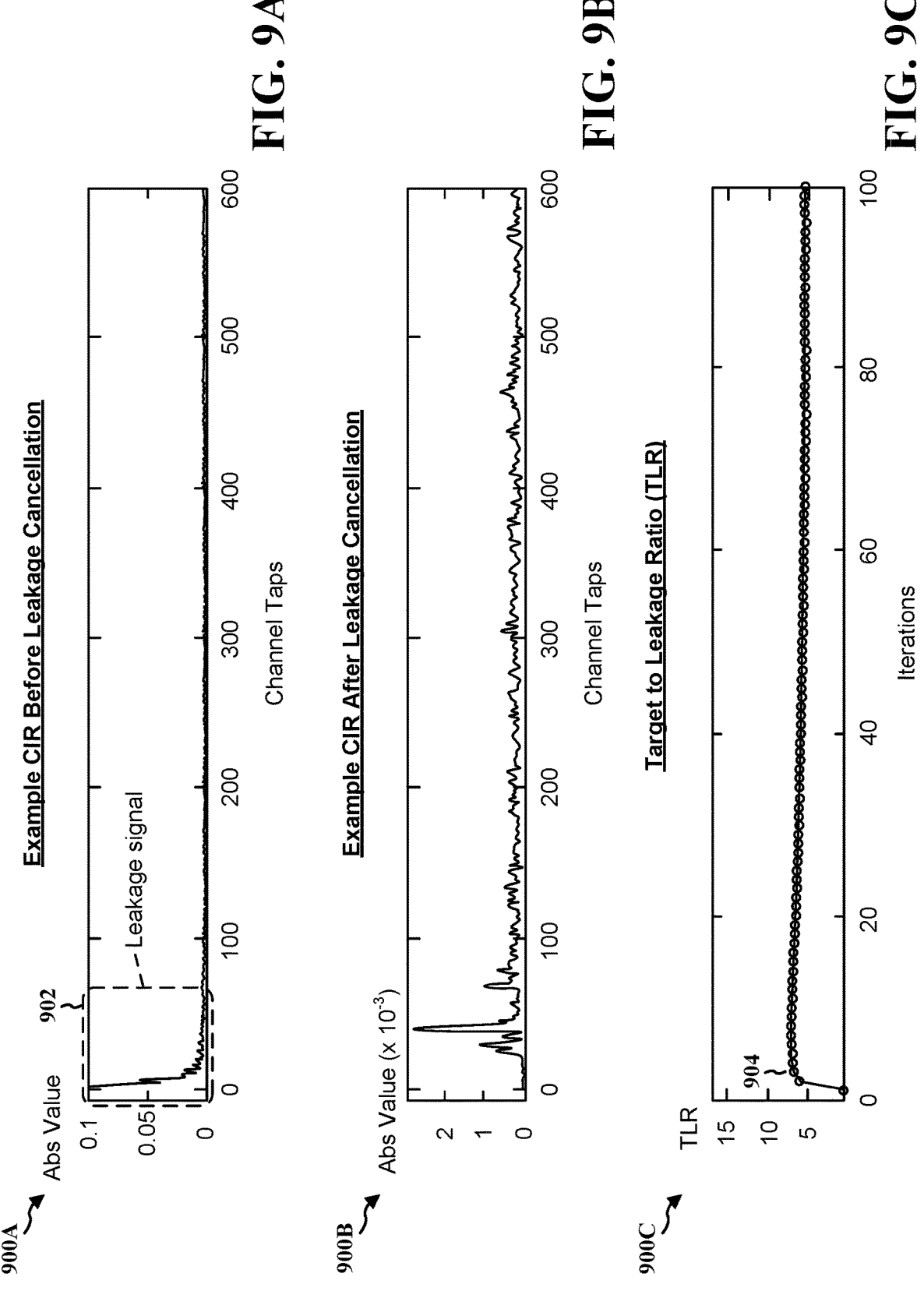
FIG. 9A is a diagram illustrating an example channel impulse response (CIR) before leakage cancellation in accordance with various aspects of the present disclosure.
FIG. 9B is a diagram illustrating an example CIR after leakage cancellation in accordance with various aspects of the present disclosure.
FIG. 9C is a diagram illustrating an example target-to-leakage power ratio (TLR) after applying the leakage cancellation for i iterations in accordance with various aspects of the present disclosure.

FIG. 9A is a diagram 900A illustrating an example CIR before leakage cancellation in accordance with various aspects of the present disclosure. As shown at 902, the first few channel taps (e.g., [0, X], [−X, . . . , 0, . . . , X], [X, Y], etc.) of the CIR of a captured signal before applying the leakage cancellation (e.g., the residual signal 804) may include very high absolute (abs) values, which may imply there is a very strong leakage signal.

FIG. 9B is a diagram 900B illustrating an example CIR after leakage cancellation in accordance with various aspects of the present disclosure. As shown by the diagram 900B, the CIR after applying the leakage cancellation may help to suppress the leakage signal (or the leakage energy) by approximately 6 dBs and make a target peak (e.g., a peak due to the reflected signal, or other multipaths) stands out which previously was overwhelmed (e.g., buried) by the leakage signal.

FIG. 9C is a diagram 900C illustrating an example target-to-leakage power ratio (TLR) after applying the leakage cancellation for i iterations (e.g., 100 iterations) in accordance with various aspects of the present disclosure. As shown at 904, to meaningfully/accurately recover/identify the energy of the target peak associated with a reflected signal with respect to the whole CIR (or to meaningfully/ accurately cancel the leakage signal), the wireless device 802 may be specified to perform just few iterations. For example, a target-to-leakage power ratio (TLR) may exceed five (5) just after three or four iterations. Here, the target may refer to the reflected signal, which is what a wireless device is configured to detect, and the leakage is what the wireless device is configured to mitigate. Before the leakage cancellation, the TLR may be very low because the leakage is too strong. After a few iterations of leakage cancellation, the TLR may be big enough to exceed a threshold, indicating that the residual leakage is small enough.

Aspects described in connection with FIG. 8 may enable a wireless device (e.g., an RF/Wi-Fi® radar, the wireless device 802, etc.) to effectively and accurately cancel leakage signals and capture reflected signals. Then, based on the captured reflected signals, the wireless device may determine whether there is at least one moving object or at least one living being (with minimal movement such as breathing) in an environment. For example, the wireless device may be configured to detect whether there is a variance across time in the captured reflected signals.

Figure 10:
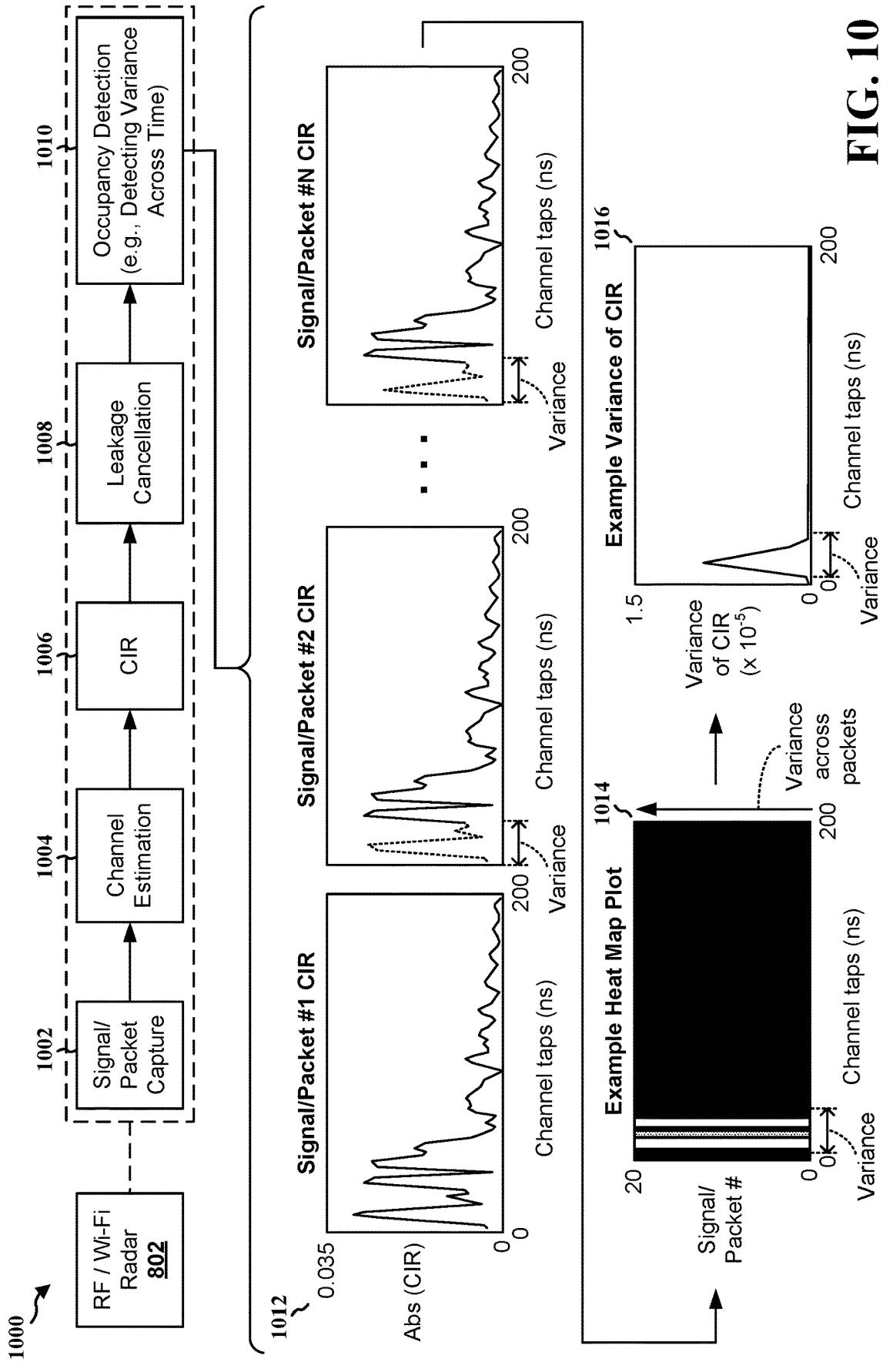
FIG. 10 is a diagram illustrating an example occupancy detection with range estimate in accordance with various aspects of the present disclosure.

FIG. 10 is a diagram 1000 illustrating an example occupancy detection with range estimate in accordance with various aspects of the present disclosure. As described in connection with FIG. 8, at 1002, the wireless device 802 may capture signals/packets transmitted by the wireless device 802 over a period time (in an environment), where the captured signals/packets may include the leakage signal(s) and the reflected signal(s) (e.g., superposition of multipaths). At 1004, the wireless device 802 may perform channel estimation for the captured signals/packets, such as measuring the CIR of the captured signals/packets as shown at 1006. At 1008, the wireless device 802 may perform leakage cancellation to extract (e.g., filter out) the reflected signal(s). In other words, for each captured signal/packet across time, the wireless device 802 may perform leakage cancellation so that peak(s) due to multipath in a CIR plot may dominate.

At 1010, the wireless device 802 may be configured to perform occupancy detection (e.g., detecting whether there is at least one moving object and/or at least one living being in an environment), such as based on detecting variance(s) in CIRs across time. For example, as shown at 1012, CIRs from signals/packets captured across a time period may be stacked up together (e.g., CIRs from signals/packets #1 to N over 200 nanoseconds (ns) may be stacked up together). For purposes of the present disclosure, a moving object may be a non-living being or a living being, which may include a living being that is performing a minimal movement such as breathing (while stand still or seated, etc.).

Then, as shown at 1014, based on the stacked up CIRs, a heat map plot (or a similar mechanism) may be generated (e.g., by the wireless device 802), where the heat map plot may show which channel tap(s) have variance(s) across signals/packets. For example, a brighter color may depict there are variances detected across a (high) number of signals/packets at a channel tap, whereas a darker color may depict there are no variances detected across signals/packets at a channel tap, etc. A detected variance may indicate that there is at least one moving object and/or at least one living being in the environment.

As shown at 1016, after identifying the variances based on the heat map plot, the wireless device 802 may compute the values of variances of CIR. For example, a plot (or a variance plot) depicting variance of CIR with respect to channel taps may be generated to identify the peak (or the index of the peak) in the plot, where the identified peak may be used for determining a path delay for a channel tap that observes a maximum variance (e.g., the path delay may be associated with the at least one moving object and/or at least one living being in the environment).

Based on the identified peak and its variance value, the wireless device 802 may determine that the peak is associated with a moving object or a living being, and the wireless device 802 may calculate a distance/range of the moving object/living being from the wireless device 802. In other words, the index of peak in a variance plot may give the distance/range of a subject from the wireless device 802. For example, the time difference between the leakage signal and the index of the variance peak may indicate the round-trip time of the signal traveling from a wireless device to a subject (e.g., a moving object) and then back to the wireless device. This time may be represented by $t_{max\_ind}$, and half of this time may indicate the time from the wireless device to the subject $$\left(\text{e.g., } \frac{t_{max\_ind}}{2}\right).$$

This half time, multiplied by the speed of light (c)

$$\left(\text{e.g., } \frac{t_{max\_ind} \times c}{2}\right)$$

may provide the distance between the wireless device and the subject. In some examples, the accuracy of the distance/range estimates may further be improved by averaging the results at multiple receiving antennas. For example, each receiving antenna (of multiple receiving antennas) may be configured to perform the operation described in connection with FIG. 10 independently. Then, the wireless device 802 may average the distance/range estimates calculated by the multiple receiving antennas (or by a defined number of receiving antennas, such as X antennas with highest estimates, etc.).

In some implementations, after the wireless device 802 detects the moving object(s)/living being(s) and/or calculates their distances with respect to the wireless device 802, the wireless device 802 may output an indication of the detected moving object(s)/living being(s) and/or their calculated/estimated distances. For example, the wireless device 802 may transmit the indication of the detected moving object(s)/living being(s) and/or their calculated/estimated distances to one or more applications that specify it (e.g., an activity recognition application, a heath monitoring application, a presence detection application, etc.), or store the indication of the detected moving object(s)/living being(s) and/or their calculated/estimated distances, such for record keeping or tracking purposes.

Figure 11:
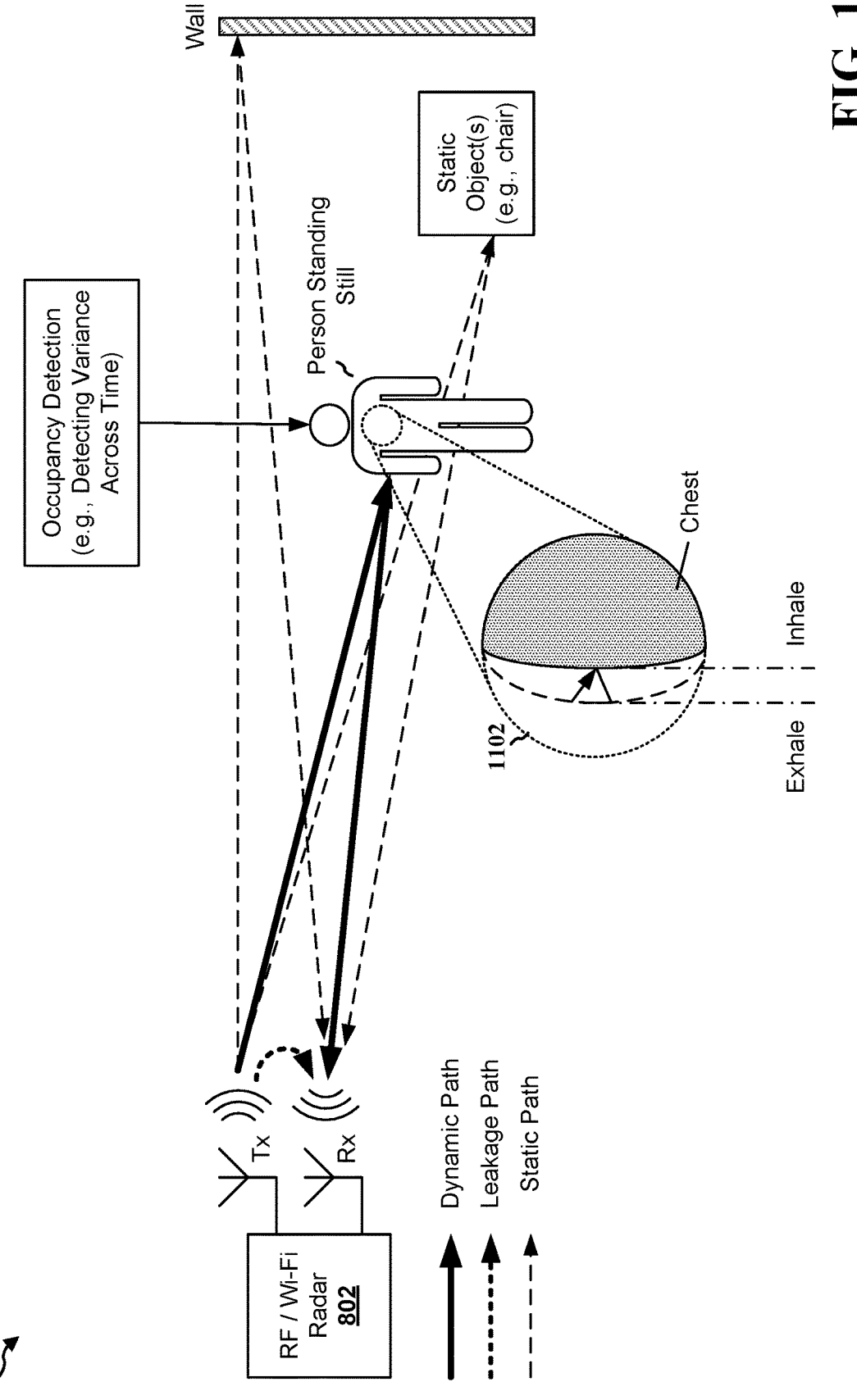
FIG. 11 is a diagram illustrating an example occupancy detection scenario for a living object with a minimum movement in accordance with various aspects of the present disclosure.

FIG. 11 is a diagram 1100 illustrating an example occupancy detection scenario for a living object with a minimum movement in accordance with various aspects of the present disclosure. After performing the leakage cancellation, as the wireless device 802 may have the capability to detect very slight changes in CIRs of signals/packets captured across time, the wireless device 802 may be able to detect minor movements on a person's chest, such as the movement associated with breathing (e.g., the displacement of the chest between inhaling and exhaling) as shown at 1102. As such, the algorithm described in connection with FIGS. 8 and 10 may be used for detecting the human presence even if a person is sitting/standing stationary in an environment. One key observation is that any living being despite being stationary may end up performing minute displacements (e.g., breathing will cause chest displacement). The leakage cancellation helps a wireless device to recover even minute and buried variations in the CIR, where the results show the distance/range estimates for scenarios where a living being is stationary and still incurs some variations in the CIR.

Aspects presented herein is directed to techniques for using leakage cancellation to improve object detection and ranging based on Wi-Fi® signals. Aspects presented herein provide leakage cancellation to improve the detection and extraction of signals variations, which may include: initialize a signal, residual signal to be equal to the captured Long Training Field (LTF); compute channel impulse response (CIR) using the residual signal through a number of iterations to extract the peaks of signals due to multipath.

FIG. 12 is a flowchart 1200 of a method of wireless communication (or object detection) at a user equipment (UE). The method may be performed by a UE (e.g., the UE 104, 404; the wireless device 502, 702, 802; the apparatus 1404). The method may improve the accuracy and reliability of object detection.

At 1204, the UE may receive a set of signals over a time period, where each signal in the set of signals includes a superposition of multipath signals traversed by the signal and a leakage signal, such as described in connection with FIGS. 8 and 10. For example, as discussed in connection with 1002 of FIG. 10, the wireless device 802 may capture signals/packets transmitted by the wireless device 802 over a period time (in an environment), where the captured signals/packets may include the leakage signal(s) and the reflected signal(s) (e.g., superposition of multipaths). The reception of the set of signals may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, to receive the set of signals, the UE may measure a channel impulse response (CIR) of the set of signals.

In another example, to receive the set of signals over the time period, the UE may receive each signal in the set of signals at a different time in the time period.

In another example, to receive the set of signals, the UE may receive, via at least one transceiver at the UE, the set of signals.

In another example, the leakage signal may be associated with at least one transmission (Tx) antenna of the UE.

At 1206, the UE may filter out the leakage signal from each signal in the set of signals to obtain the superposition of the multipath signals for each signal, such as described in connection with FIGS. 8 and 10. For example, as discussed in connection with 1008 of FIG. 10, the wireless device 802 may perform leakage cancellation to extract (e.g., filter out) the reflected signal(s). In other words, for each captured signal/packet across time, the wireless device 802 may perform leakage cancellation so that peak(s) due to multipath in a CIR plot may dominate. The filtering of the leakage signal may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, to filter out the leakage signal from each signal in the set of signals to obtain the superposition of the multipath signals for each signal, the UE may compute a first CIR for each signal in the set of signals, compute a second CIR for each signal in the set of signals based on setting channel taps that are not associated with the leakage signal in the first CIR to zeros, convolve the second CIR with a reference signal to obtain a temporary signal, and remove the temporary signal from each signal to obtain the multipath signals for each signal. In some implementations, the leakage signal corresponds to a first X channel taps in the first CIR, where X is an integer. In some implementations, the reference signal is a signal that has not been transmitted by the UE over a channel.

At 1208, the UE may detect whether there is a variance across the filtered set of signals over the time period, such as described in connection with FIGS. 8 and 10. For example, as discussed in connection with 1010 of FIG. 10, the wireless device 802 may be configured to perform occupancy detection (e.g., detecting whether there is at least one moving object and/or at least one living being in an environment), such as based on detecting variance(s) in CIRs across time. The detection of the variance may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

At 1210, the UE may identify a presence of at least one moving object in response to the detection of the variance, such as described in connection with FIGS. 8 and 10. For example, as discussed in connection with 1014 of FIG. 10, based on the stacked up CIRs, a heat map plot may be generated (e.g., by the wireless device 802), where the heat map plot may show which channel tap(s) have variance(s) across signals/packets. A detected variance may indicate that there is at least one moving object and/or at least one living being in the environment. The identification of the presence of at least one moving object may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, the UE may transmit, over the time period, the set of signals prior to the reception of the set of signals, where to receive the set of signals over the time period, the UE may receive the set of signals after the set of signals reflects from one or more objects, where the one or more objects include the at least one moving object, such as described in connection with FIGS. 8 and 10. For example, as discussed in connection with 1002 of FIG. 10, the wireless device 802 may capture signals/packets transmitted by the wireless device 802 over a period time (in an environment). The transmission of the set of signals may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In another example, the UE may calculate, based on the variance, a distance from each object in the at least one moving object to the UE, such as described in connection with FIGS. 8 and 10. For example, as discussed in connection with 1016 of FIG. 10, based on the identified peak and its variance value, the wireless device 802 may determine that the peak is associated with a moving object or a living being, and the wireless device 802 may calculate a distance/range of the moving object/living being from the wireless device 802. The calculation of the distance may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In another example, to calculate the distance from each object in the at least one moving object to the UE, the UE may identifying an index of a peak in the variance for each moving object, determine a path delay associated with the index of the peak in the variance for each moving object, and calculate the distance from each moving object to the UE based on the path delay for each moving object.

In another example, the UE may output an indication of the identified presence of the at least one moving object. In some implementations, to output the indication of the identified presence of the at least one moving object, the UE may transmit the indication of the identified presence of the at least one moving object, or store the indication of the identified presence of the at least one moving object.

FIG. 13 is a flowchart 1300 of a method of wireless communication (or object detection) at a user equipment (UE). The method may be performed by a UE (e.g., the UE 104, 404; the wireless device 502, 702, 802; the apparatus 1404). The method may improve the accuracy and reliability of object detection.

At 1304, the UE may receive a set of signals over a time period, where each signal in the set of signals includes a superposition of multipath signals traversed by the signal and a leakage signal, such as described in connection with FIGS. 8 and 10. For example, as discussed in connection with 1002 of FIG. 10, the wireless device 802 may capture signals/packets transmitted by the wireless device 802 over a period time (in an environment), where the captured signals/packets may include the leakage signal(s) and the reflected signal(s) (e.g., superposition of multipaths). The reception of the set of signals may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, to receive the set of signals, the UE may measure a CIR of the set of signals.

In another example, to receive the set of signals over the time period, the UE may receive each signal in the set of signals at a different time in the time period.

In another example, to receive the set of signals, the UE may receive, via at least one transceiver at the UE, the set of signals.

In another example, the leakage signal may be associated with at least one Tx antenna of the UE.

At 1306, the UE may filter out the leakage signal from each signal in the set of signals to obtain the superposition of the multipath signals for each signal, such as described in connection with FIGS. 8 and 10. For example, as discussed in connection with 1008 of FIG. 10, the wireless device 802 may perform leakage cancellation to extract (e.g., filter out) the reflected signal(s). In other words, for each captured signal/packet across time, the wireless device 802 may perform leakage cancellation so that peak(s) due to multipath in a CIR plot may dominate. The filtering of the leakage signal may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, to filter out the leakage signal from each signal in the set of signals to obtain the superposition of the multipath signals for each signal, the UE may compute a first CIR for each signal in the set of signals, compute a second CIR for each signal in the set of signals based on setting channel taps that are not associated with the leakage signal in the first CIR to zeros, convolve the second CIR with a reference signal to obtain a temporary signal, and remove the temporary signal from each signal to obtain the multipath signals for each signal. In some implementations, the leakage signal corresponds to a first X channel taps in the first CIR, where X is an integer. In some implementations, the reference signal is a signal that has not been transmitted by the UE over a channel.

At 1308, the UE may detect whether there is a variance across the filtered set of signals over the time period, such as described in connection with FIGS. 8 and 10. For example, as discussed in connection with 1010 of FIG. 10, the wireless device 802 may be configured to perform occupancy detection (e.g., detecting whether there is at least one moving object and/or at least one living being in an environment), such as based on detecting variance(s) in CIRs across time. The detection of the variance may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

At 1310, the UE may identify a presence of at least one moving object in response to the detection of the variance, such as described in connection with FIGS. 8 and 10. For example, as discussed in connection with 1014 of FIG. 10, based on the stacked up CIRs, a heat map plot may be generated (e.g., by the wireless device 802), where the heat map plot may show which channel tap(s) have variance(s) across signals/packets. A detected variance may indicate that there is at least one moving object and/or at least one living being in the environment. The identification of the presence of at least one moving object may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, as shown at 1302, the UE may transmit, over the time period, the set of signals prior to the reception of the set of signals, where to receive the set of signals over the time period, the UE may receive the set of signals after the set of signals reflects from one or more objects, where the one or more objects include the at least one moving object, such as described in connection with FIGS. 8 and 10. For example, as discussed in connection with 1002 of FIG. 10, the wireless device 802 may capture signals/packets transmitted by the wireless device 802 over a period time (in an environment). The transmission of the set of signals may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In another example, as shown at 1312, the UE may calculate, based on the variance, a distance from each object in the at least one moving object to the UE, such as described in connection with FIGS. 8 and 10. For example, as discussed in connection with 1016 of FIG. 10, based on the identified peak and its variance value, the wireless device 802 may determine that the peak is associated with a moving object or a living being, and the wireless device 802 may calculate a distance/range of the moving object/living being from the wireless device 802. The calculation of the distance may be performed by, e.g., the object detection component 198, the one or more sensors 1418, the UWB module 1438, the transceiver(s) 1422, the cellular baseband processor(s) 1424, and/or the application processor(s) 1406 of the apparatus 1404 in FIG. 14.

In one example, to calculate the distance from each object in the at least one moving object to the UE, the UE may identifying an index of a peak in the variance for each moving object, determine a path delay associated with the index of the peak in the variance for each moving object, and calculate the distance from each moving object to the UE based on the path delay for each moving object.

In another example, the UE may output an indication of the identified presence of the at least one moving object. In some implementations, to output the indication of the identified presence of the at least one moving object, the UE may transmit the indication of the identified presence of the at least one moving object, or store the indication of the identified presence of the at least one moving object.

US 12,601,827 B2

29

Figure 14:
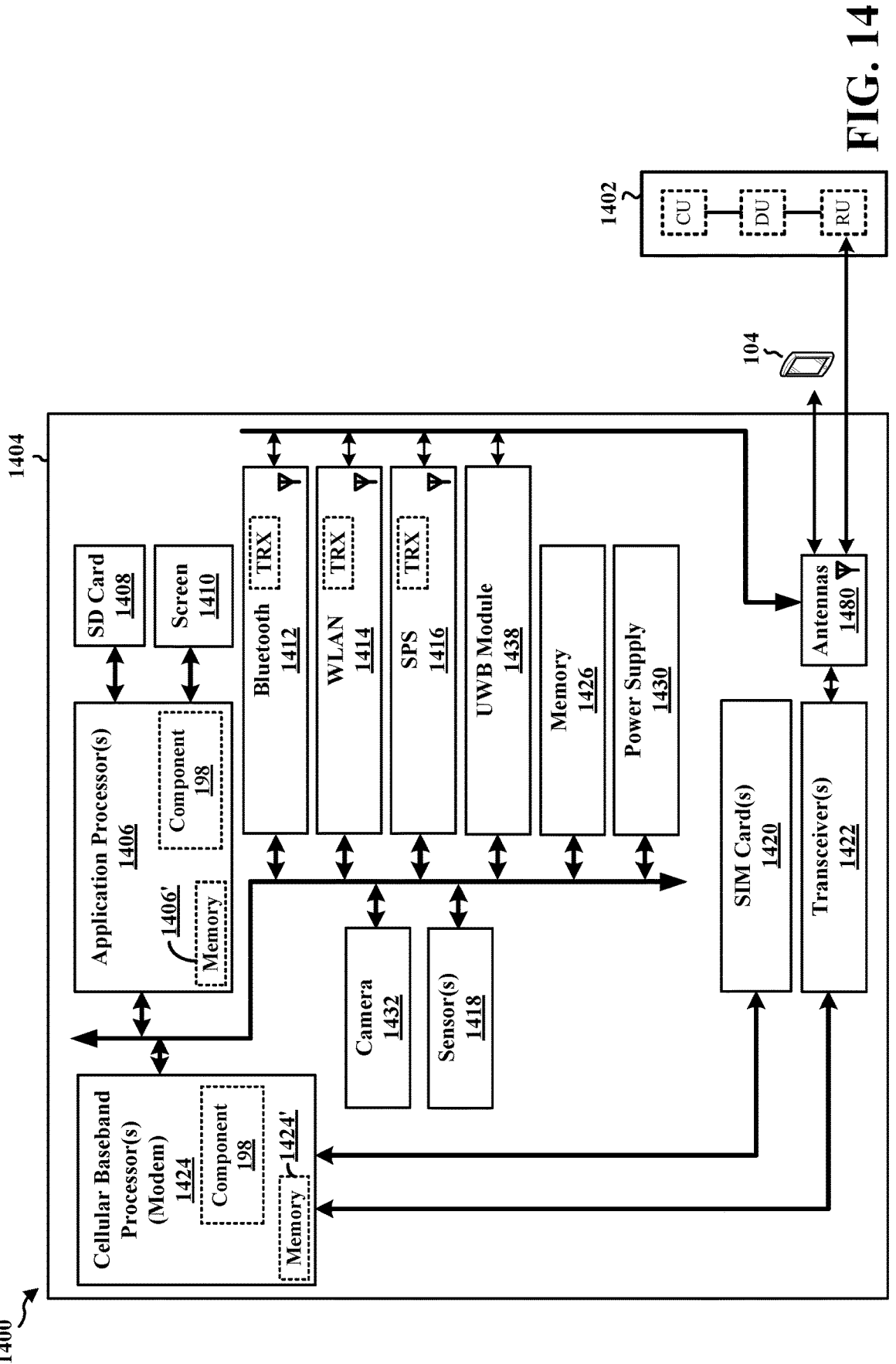
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an ultrawide band (UWB) module 1438, an SPS module 1416 (e.g., GNSS module), one or more sensors 1418 (e.g., barometric pressure sensor/altimeter; motion sensor such as inertial measurement unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the UWB module 1438, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the object detection component 198 may be configured to receive a set of signals over a time period, where each signal in the set of signals includes a superposition of multipath signals traversed by the signal and a leakage signal. The object detection component 198 may also be configured to filter out the leakage signal from each signal in the set of signals to obtain the superposition of the multipath signals for each signal. The object detection component 198 may also be configured to detect whether there is a variance across the filtered set of signals over the time period. The object detection component 198 may also be configured to identify a presence of at least one moving object in response to the detection of the variance. The object detection component 198 may be within the cellular baseband processor(s) 1424, the application processor(s) 1406, or both the cellular baseband processor(s) 1424 and the application processor(s) 1406. The object detection component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for receiving a set of signals over a time period, where each signal in the set of signals includes a superposition of multipath signals traversed by the signal and a leakage signal. The apparatus 1404 may further include means for filtering out the leakage signal from each signal in the set of signals to obtain the superposition of the multipath signals for each signal. The apparatus 1404 may further include means for detecting whether there is a variance across the filtered set of signals over the time period. The apparatus 1404 may further include means for identifying a presence of at least one moving object in response to the detection of the variance.

In one configuration, the means for receiving the set of signals may include configuring the apparatus 1404 to measure a channel impulse response (CIR) of the set of signals.

In another configuration, the means for receiving the set of signals over the time period may include configuring the apparatus 1404 to receive each signal in the set of signals at a different time in the time period.

In another configuration, the means for receiving the set of signals may include configuring the apparatus 1404 to receive, via at least one transceiver at the UE, the set of signals.

In another configuration, the leakage signal may be associated with at least one Tx antenna of the apparatus 1404.

In another configuration, the means for filtering out the leakage signal from each signal in the set of signals to obtain the superposition of the multipath signals for each signal may include configuring the apparatus 1404 to compute a first CIR for each signal in the set of signals, compute a second CIR for each signal in the set of signals based on setting channel taps that are not associated with the leakage signal in the first CIR to zeros, convolve the second CIR with a reference signal to obtain a temporary signal, and remove the temporary signal from each signal to obtain the multipath signals for each signal. In some implementations, the leakage signal may correspond to a first X channel taps in the first CIR, where X is an integer. In some implementations, the reference signal may be a signal that has not been transmitted by the UE over a channel.

In another configuration, the apparatus 1404 may further include means for transmitting, over the time period, the set of signals prior to the reception of the set of signals, where the means for receiving the set of signals over the time period may include configuring the apparatus 1404 to receive the set of signals after the set of signals reflects from one or more objects, where the one or more objects include the at least one moving object.

In another configuration, the apparatus 1404 may further include means for calculating, based on the variance, a distance from each object in the at least one moving object to the apparatus 1404.

In another configuration, the means for calculate the distance from each object in the at least one moving object to the apparatus 1404 may include configuring the apparatus 1404 to identifying an index of a peak in the variance for each moving object, determine a path delay associated with the index of the peak in the variance for each moving object, and calculate the distance from each moving object to the UE based on the path delay for each moving object.

In another configuration, the apparatus 1404 may further include means for outputting an indication of the identified presence of the at least one moving object. In some implementations, the means for outputting the indication of the identified presence of the at least one moving object may include configuring the apparatus 1404 to transmit the indication of the identified presence of the at least one moving object, or store the indication of the identified presence of the at least one moving object.

The means may be the object detection component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a set of signals over a time period, wherein each signal in the set of signals includes a superposition of multipath signals traversed by the signal and a leakage signal; filtering out the leakage signal from each signal in the set of signals to obtain the superposition of the multipath signals for each signal; detecting whether there is a variance across the filtered set of signals over the time period; and identifying a presence of at least one moving object in response to the detection of the variance.

Aspect 2 is the method of aspect 1, further comprising: calculating, based on the variance, a distance from each object in the at least one moving object to the UE.

Aspect 3 is the method of aspect 1 or aspect 2, wherein calculating the distance from each object in the at least one moving object to the UE comprises: identifying an index of a peak in the variance for each moving object; determining a path delay associated with the index of the peak in the variance for each moving object; and calculating the distance from each moving object to the UE based on the path delay for each moving object.

Aspect 4 is the method of any of aspects 1 to 3, further comprising: transmitting, over the time period, the set of signals prior to the reception of the set of signals; and wherein receiving the set of signals over the time period comprises receiving the set of signals after the set of signals reflects from one or more objects, wherein the one or more objects include the at least one moving object.

Aspect 5 is the method of any of aspects 1 to 4, wherein the at least one moving object includes at least one living being.

Aspect 6 is the method of any of aspects 1 to 5, wherein receiving the set of signals comprises: measuring a channel impulse response (CIR) of the set of signals.

Aspect 7 is the method of any of aspects 1 to 6, wherein filtering out the leakage signal from each signal in the set of signals to obtain the superposition of the multipath signals for each signal comprises: computing a first channel impulse response (CIR) for each signal in the set of signals; computing a second CIR for each signal in the set of signals based on setting channel taps that are not associated with the leakage signal in the first CIR to zeros; convolving the second CIR with a reference signal to obtain a temporary signal; and removing the temporary signal from each signal to obtain the multipath signals for each signal.

Aspect 8 is the method of any of aspects 1 to 7, wherein the leakage signal corresponds to a first X channel taps in the first CIR, where X is an integer.

Aspect 9 is the method of any of aspects 1 to 8, wherein the reference signal is a signal that has not been transmitted by the UE over a channel.

Aspect 10 is the method of any of aspects 1 to 9, further comprising: outputting an indication of the identified presence of the at least one moving object.

Aspect 11 is the method of any of aspects 1 to 10, wherein outputting the indication of the identified presence of the at least one moving object comprises: transmitting the indication of the identified presence of the at least one moving object; or storing the indication of the identified presence of the at least one moving object.

Aspect 12 is the method of any of aspects 1 to 11, wherein receiving the set of signals over the time period comprises: receiving each signal in the set of signals at a different time in the time period.

Aspect 13 is the method of any of aspects 1 to 12, wherein receiving the set of signals comprises: receiving, via at least one transceiver at the UE, the set of signals.

Aspect 14 is the method of any of aspects 1 to 13, wherein the leakage signal is associated with at least one transmission (Tx) antenna of the UE.

Aspect 15 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 1 to 14.

Aspect 16 is the apparatus of aspect 15, further including at least one transceiver coupled to the at least one processor.

Aspect 17 is an apparatus for wireless communication at a user equipment (UE), including means for implementing any of aspects 1 to 14.

Aspect 18 is a computer-readable medium (e.g., a non-transitory computer-readable medium) storing computer executable code, where the code when executed by a processor causes the processor to implement any of aspects 1 to 14.

What is claimed is:

1. An apparatus for wireless communication at a user equipment (UE), comprising:
    at least one memory; and
    at least one processor coupled to the at least one memory, the at least one processor is configured to:
        receive a set of signals over a time period, wherein each signal in the set of signals includes a superposition of multipath signals traversed by the signal and a leakage signal;
        compute a first channel impulse response (CIR) for each signal in the set of signals;
        compute a second CIR for each signal in the set of signals based on setting channel taps that are not associated with the leakage signal in the first CIR to zeros;
        convolve the second CIR with a reference signal to obtain a temporary signal;
        remove the temporary signal from each signal to obtain the multipath signals for each signal in the set of signals;
        detect, based on the multipath signals for each signal in the set of signals, whether there is a variance across the set of signals over the time period; and
        identify a presence of at least one moving object in response to the detection of the variance.

2. The apparatus of claim 1, wherein the at least one processor, individually or in any combination, is further configured to:
    calculate, based on the variance, a distance from each object in the at least one moving object to the UE.

3. The apparatus of claim 2, wherein to calculate the distance from each object in the at least one moving object to the UE, the at least one processor, individually or in any combination, is configured to:
    identify an index of a peak in the variance for each moving object;
    determine a path delay associated with the index of the peak in the variance for each moving object; and
    calculate the distance from each moving object to the UE based on the path delay for each moving object.

4. The apparatus of claim 1, wherein the at least one processor, individually or in any combination, is further configured to:
    transmit, over the time period, the set of signals prior to the reception of the set of signals; and wherein to receive the set of signals over the time period, the at least one processor, individually or in any combination, is configured to receive the set of signals after the set of signals reflects from one or more objects, wherein the one or more objects include the at least one moving object.

5. The apparatus of claim 1, wherein the at least one moving object includes at least one living being.

6. The apparatus of claim 1, wherein to receive the set of signals, the at least one processor, individually or in any combination, is configured to:

measure a CIR of the set of signals.

7. The apparatus of claim 1, wherein the leakage signal corresponds to a first X channel taps in the first CIR, where X is an integer.

8. The apparatus of claim 1, wherein the reference signal is a signal that has not been transmitted by the UE over a channel.

9. The apparatus of claim 1, wherein the at least one processor, individually or in any combination, is further configured to:

output an indication of the identified presence of the at least one moving object.

10. The apparatus of claim 9, wherein to output the indication of the identified presence of the at least one moving object, the at least one processor, individually or in any combination, is configured to:

transmit the indication of the identified presence of the at least one moving object; or store the indication of the identified presence of the at least one moving object.

11. The apparatus of claim 1, wherein to receive the set of signals over the time period, the at least one processor, individually or in any combination, is configured to:

receive each signal in the set of signals at a different time in the time period.

12. The apparatus of claim 1, wherein to receive the set of signals, the at least one processor, individually or in any combination, is configured to:

receive, via at least one transceiver at the UE, the set of signals.

13. The apparatus of claim 1, wherein the leakage signal is associated with at least one transmission (Tx) antenna of the UE.

14. A method of wireless communication at a user equipment (UE), comprising:

receiving a set of signals over a time period, wherein each signal in the set of signals includes a superposition of multipath signals traversed by the signal and a leakage signal;

computing a first channel impulse response (CIR) for each signal in the set of signals;

computing a second CIR for each signal in the set of signals based on setting channel taps that are not associated with the leakage signal in the first CIR to zeros;

convolving the second CIR with a reference signal to obtain a temporary signal;

removing the temporary signal from each signal to obtain the multipath signals for each signal;

detecting, based on the multipath signals for each signal in the set of signals, whether there is a variance across the set of signals over the time period; and identifying a presence of at least one moving object in response to the detection of the variance.

15. The method of claim 14, further comprising:

calculating, based on the variance, a distance from each object in the at least one moving object to the UE.

16. The method of claim 15, wherein calculating the distance from each object in the at least one moving object to the UE comprises:

identifying an index of a peak in the variance for each moving object;

determining a path delay associated with the index of the peak in the variance for each moving object; and calculating the distance from each moving object to the UE based on the path delay for each moving object.

17. The method of claim 14, further comprising:

transmitting, over the time period, the set of signals prior to the reception of the set of signals; and wherein receiving the set of signals over the time period comprises receiving the set of signals after the set of signals reflects from one or more objects, wherein the one or more objects include the at least one moving object.

18. The method of claim 14, wherein the at least one moving object includes at least one living being.

19. The method of claim 14, wherein receiving the set of signals comprises:

measuring a CIR of the set of signals.

20. The method of claim 14, wherein the leakage signal corresponds to a first X channel taps in the first CIR, where X is an integer.

21. The method of claim 14, wherein the reference signal is a signal that has not been transmitted by the UE over a channel.

22. The method of claim 14, further comprising:

outputting an indication of the identified presence of the at least one moving object.

23. The method of claim 22, wherein outputting the indication of the identified presence of the at least one moving object comprises:

transmitting the indication of the identified presence of the at least one moving object; or storing the indication of the identified presence of the at least one moving object.

24. The method of claim 14, wherein receiving the set of signals over the time period comprises:

receiving each signal in the set of signals at a different time in the time period.

25. The method of claim 14, wherein receiving the set of signals comprises:

receiving, via at least one transceiver at the UE, the set of signals.

26. The method of claim 14, wherein the leakage signal is associated with at least one transmission (Tx) antenna of the UE.

27. An apparatus for wireless communication at a user equipment (UE), comprising:

means for receiving a set of signals over a time period, wherein each signal in the set of signals includes a superposition of multipath signals traversed by the signal and a leakage signal;

means for computing a first channel impulse response (CIR) for each signal in the set of signals;

means for computing a second CIR for each signal in the set of signals based on setting channel taps that are not associated with the leakage signal in the first CIR to zeros;

means for convolving the second CIR with a reference signal to obtain a temporary signal;

means for removing the temporary signal from each signal to obtain the multipath signals for each signal;

means for detecting, based on the multipath signals for each signal in the set of signals, whether there is a variance across the set of signals over the time period; and means for identifying a presence of at least one moving object in response to the detection of the variance.

28. A non-transitory computer-readable medium storing computer executable code, the code when executed by at least one processor causes the at least one processor to:

receive a set of signals over a time period, wherein each signal in the set of signals includes a superposition of multipath signals traversed by the signal and a leakage signal;

compute a first channel impulse response (CIR) for each signal in the set of signals;

compute a second CIR for each signal in the set of signals based on setting channel taps that are not associated with the leakage signal in the first CIR to zeros;

convolve the second CIR with a reference signal to obtain a temporary signal;

remove the temporary signal from each signal to obtain the multipath signals for each signal in the set of signals;

detect, based on the multipath signals for each signal in the set of signals, whether there is a variance across the set of signals over the time period; and identify a presence of at least one moving object in response to the detection of the variance.

\*    \*    \*    \*    \*